United States Patent [19]

Thomson et al.

[11] 4,271,930
[45] Jun. 9, 1981

[54] ENCLOSED LUBRICATING APPARATUS

[75] Inventors: Ronald E. Thomson, Lake Mills; David W. Hammermeister, Sun Prairie, both of Wis.

[73] Assignee: Madison-Kipp Corporation, Madison, Wis.

[21] Appl. No.: 31,154

[22] Filed: Apr. 18, 1979

Related U.S. Application Data

[63] Continuation-in-part of Ser. No. 902,908, May 5, 1978, abandoned.

[51] Int. Cl.$^3$ ............................................. F16N 7/38
[52] U.S. Cl. .................................. 184/15 A; 198/500
[58] Field of Search ................ 184/15 A, 15 B, 15 R; 198/500

[56] References Cited

U.S. PATENT DOCUMENTS

| 2,908,355 | 10/1959 | Moore | 184/15 A |
| 3,116,810 | 1/1964 | Olson | 184/15 B |
| 3,599,753 | 8/1971 | Walsh | 184/15 A |
| 3,684,059 | 8/1972 | Stoner | 184/15 B |
| 4,064,970 | 12/1977 | Reeves | 184/15 B |

Primary Examiner—David H. Brown
Attorney, Agent, or Firm—Merriam, Marshall & Bicknell

[57] ABSTRACT

A compact, self-contained lubricating device for lubricating a movable conveyor or other system while the conveyor or system is in operation. In a first embodiment, a tank enclosure for containing a reservoir of lubricating fluid includes a coverplate to which is mounted a pneumatically operable pump having an inlet immersed in the reservoir, a manifold with several air and lubricating fluid passageways, an air pressure regulator and a quick air exhaust valve. An air valve trip device is mounted for actuation by the conveyor system and pneumatically coupled to the pump through the manifold to deliver clean shots of lubricating fluid to the conveyor or system. In a second embodiment, a lubricating fluid reservoir is mounted above a control module enclosure. The control module enclosure contains a pump, fluid manifold and fluid interconnecting lines to seal these components from any possible destructive environment. A flexible tube communicates the reservoir outlet to the pump inlet, and a pair of side inspection plates on the control module enclosure permit inspection and access to the module interior.

15 Claims, 11 Drawing Figures

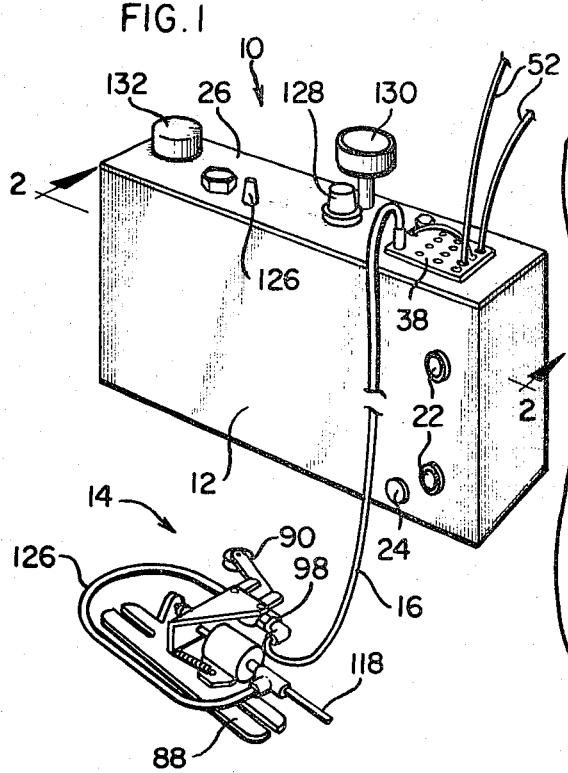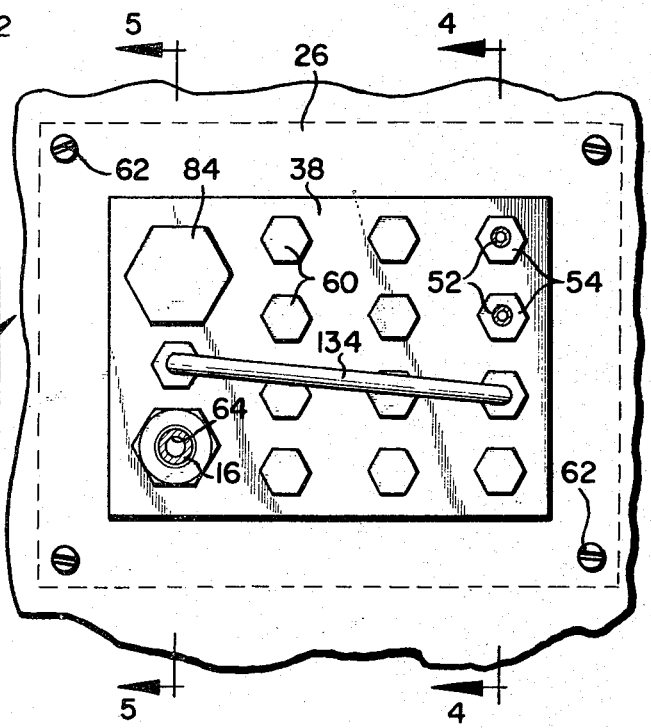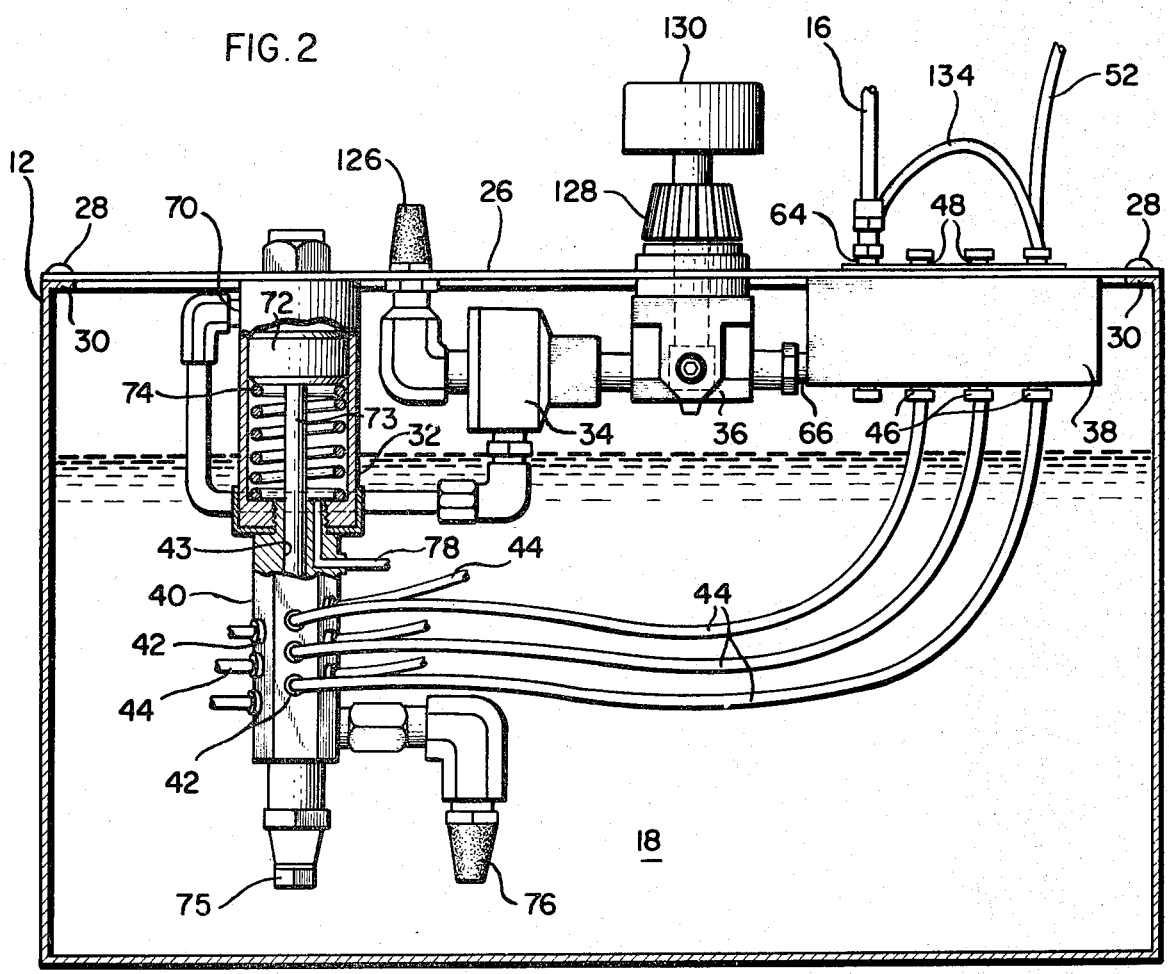

ENCLOSED LUBRICATING APPARATUS

This is a continuation-in-part of application Ser. No. 902,908, filed May 5, 1978, now abandoned.

This invention relates to automated type lubricating devices and more particularly to such devices which can lubricate a conveyor chain or other system, such as rotating machinery, etc., while the chain or system is in operation.

BACKGROUND OF THE INVENTION

Various devices are presently in use for providing what is known as a desired "clean shot" of lubricating fluid, rather than a mist, drip, fog or spray, on a particular part of a conveyor chain as the chain travels past the lubricating station in the course of the conveyor operation. As an example, reference may be made to U.S. Pat. No. 3,869,023, R. E. Thomson, et al., assigned to the same assignee herein, which describes such a device for delivering a clean shot of lubricating fluid. The device illustrated therein employs a reservoir of lubricating fluid such as oil, an oil pump, conduits interconnecting the pump with the reservoir, nozzles for ejecting lubricant from the pump onto selected portions of the conveyor, and an actuating member in intermittent contact with the conveyor for correspondingly actuating the pump to deliver clean shots of lubricating fluid to the conveyor system. The several individual components of the lubricating device must be separately installed in their desired locations with the various interconnections for the conduit lines between the components then being made.

While the lubricating device illustrated in the aforementioned patent, as well as others presently in use, operate entirely satisfactorily for the purpose intended, it is now desired to provide a more compact, self-contained unit which can be more readily handled and installed at the lubricating site. In addition it is desired to provide an automated lubricating device which can better withstand any corrosive, or otherwise possibly destructive environments while still meeting the stringent reliable delivery of lubricating fluid requirement for such units.

SUMMARY OF THE INVENTION

In accordance with the principles of the present invention, there is provided a compact, self-contained lubricating device for a moving conveyor system which requires only a minimum of external connections at the lubricating site in order to install and operate the unit. In particular, installation of the lubricating device of the present invention can be accomplished by merely positioning an air valve trip mechanism, mounting the desired number of lubricating lines and nozzles, and connecting a source of pressurized air to the trip mechanism.

The self-contained lubricating device in accordance with one embodiment of the present invention includes an enclosure for containing a reservoir of lubricating fluid. A pump having an inlet immersible in the lubricating fluid, a fluid manifold, and conduit lines interconnecting the pump and the manifold are mounted to a coverplate on the enclosure which thereby seals the pump, manifold and interconnecting lines from any possibly destructive environment. Furthermore, this permits the entire unit to be self-contained, including having its own lubricating fluid reservoir, and yet the components are readily accessible for easier maintenance by simply removing the coverplate. The trip mechanism includes an arm pivoted by a portion of the conveyor system to control an air valve coupled to the pneumatically operable pump to deliver clean shots of lubricant through the nozzles.

Installation of the lubricating device is readily accomplished. Oil or other lubricating fluid is poured through a port in the enclosure coverplate so as to fill the reservoir. The trip mechanism containing an air valve is positioned in the conveyor system. The desired number of lubricating lines are connected at one end to the manifold portion on the exterior of the coverplate and the nozzles at the other end are positioned where desired. The device is ready for operation simply by coupling a suitable source of pressurized air to the trip mechanism. Accordingly, the improved device of the present invention is compact, self-contained, readily installed and reliably protected from the possibly destructive effects of any corrosive or dirty environment while still being readily accessible for maintenance. Furthermore, the close mounting on the coverplate of an air pressure regulator and a quick air exhaust valve with respect to the pump assists in enabling the pump to deliver clean shots of lubricating fluid and in more rapid lubricating cycles compared to prior art devices.

The self-contained lubricating device in accordance with another embodiment of the invention includes a lubricating fluid reservoir mounted above a control module enclosure. A pump, fluid manifold and interconnecting lines are mounted within the control module enclosure to seal these components from any possibly destructive environment, thus incorporating the same feature as the first mentioned embodiment. A flexible tube communicates the reservoir outlet to the pump inlet. A pair of side inspection plates on the control module enclosure permit ready access to the components mounted within this module.

The second embodiment may be preferred over the first embodiment. During initial installation, the second embodiment configuration enables the user to readily check the online operation of the components in the control module. Any fluid leaks or defective components may be corrected prior to final installation.

BRIEF DESCRIPTION OF THE DRAWINGS

The invention will be better understood from the following detailed description thereof, taken in conjunction with the accompanying drawings, wherein:

FIG. 1 is a perspective view of an embodiment of the invention illustrating an enclosure tank containing the lubricating fluid reservoir and a coverplate on which components of the lubricating device are mounted in a sealing matter, and an air valve trip mechanism;

FIG. 2 is a sectional view taken along lines 2—2 of FIG. 1 illustrating the various components of the device mounted within the enclosure;

FIG. 3 is a fragmentary plan view illustrating the external fluid terminals or ports of a manifold mounted to the coverplate;

DETAILED DESCRIPTION

Figure 4:
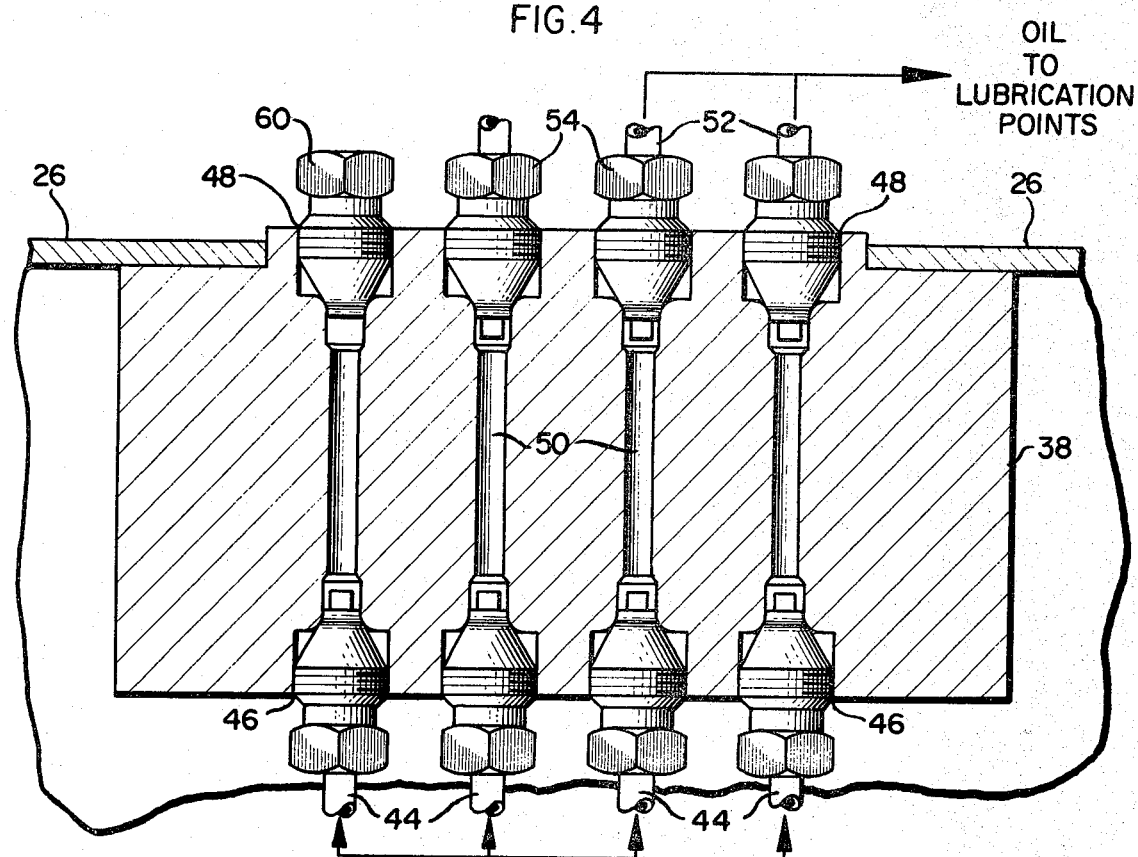
FIG. 4 is a fragmentary, sectional view taken along lines 4—4 of FIG. 3 illustrating the manifold passageways and several internal and external fluid terminals or ports.
Figure 5:
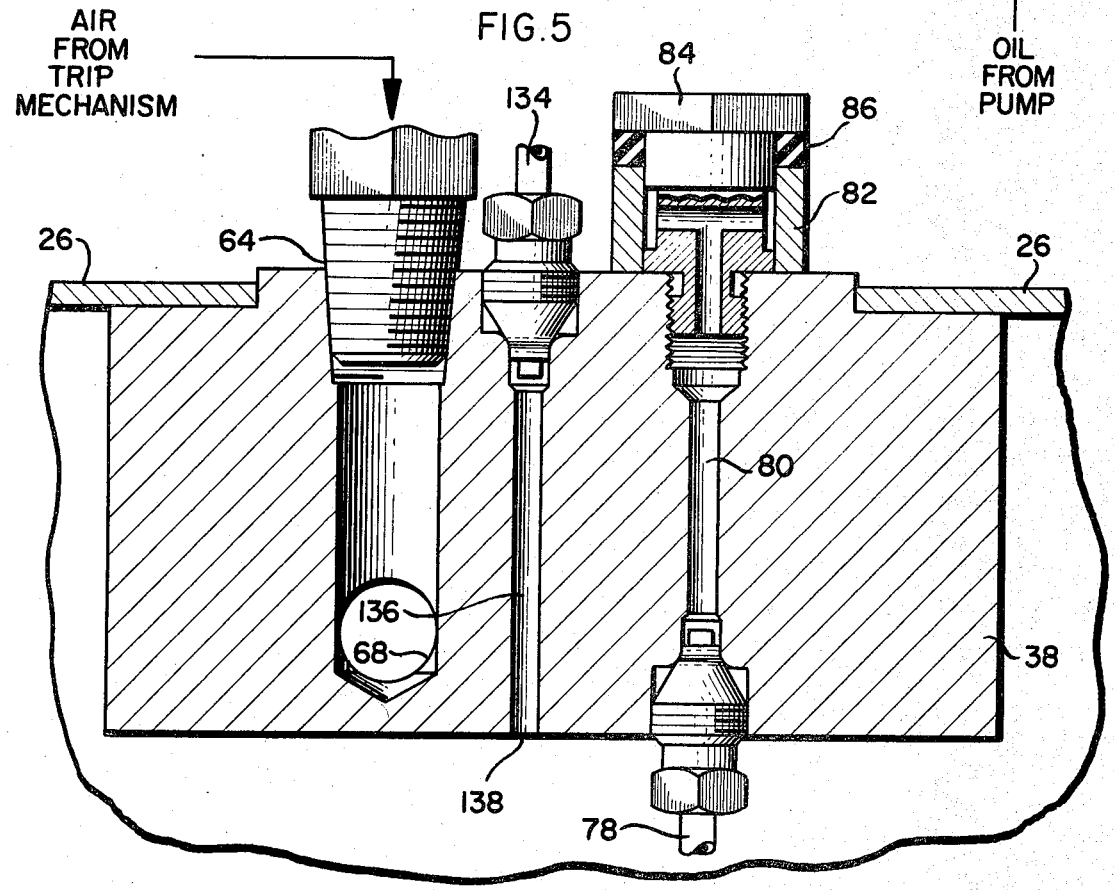
FIG. 5 is a fragmentary, sectional view taken along lines 5—5 of FIG. 3 illustrating additional fluid terminals and passageways provided in the manifold.

Referring now to FIG. 1, there is illustrated a lubricating apparatus 10 including a tank enclosure 12 for containing a reservoir of lubricating fluid and several system components, an air valve trip mechanism 14 positionable adjacent a conveyor chain which is to be lubricated, and a flexible air line conduit or tubing 16. The upstanding sides and bottom portion of enclosure 12 define a tank for holding a reservoir of lubricating fluid 18 filled, for instance, within the enclosure 12 to the level 20 as shown in FIG. 2. A pair of sight glasses 22 are mounted in one of the enclosure walls to permit viewing the fluid level within tank enclosure 12. Drain plug 24 permits draining the fluid from the tank as desired. A coverplate 26 removably seals the top of enclosure 12 by means such as screws 28 threadably engaging a lip 30 provided around the top of enclosure 12, it being understood that a gasket is placed intermediate the lip 30 and coverplate 26 to provide a fluid seal.

A lubricating fluid pump 32, quick exhaust air valve 34, air pressure regulator valve 36 and fluid manifold 38 are mounted to coverplate 26 so that when the plate is located on top of the enclosure, the various system components are sealed within the enclosure and are not susceptible to the possibly damaging effects of any corrosive and dirty environment within which the lubricating device may operate. In addition, mounting of many of the system components within tank enclosure 12 permits the lubricating device 10 to be extremely compact, and readily installed for operation. Furthermore, the major components are readily accessible for any maintenance by removing the coverplate from the tank enclosure and bringing it to a maintenance station, if desired or required.

Figure 8:
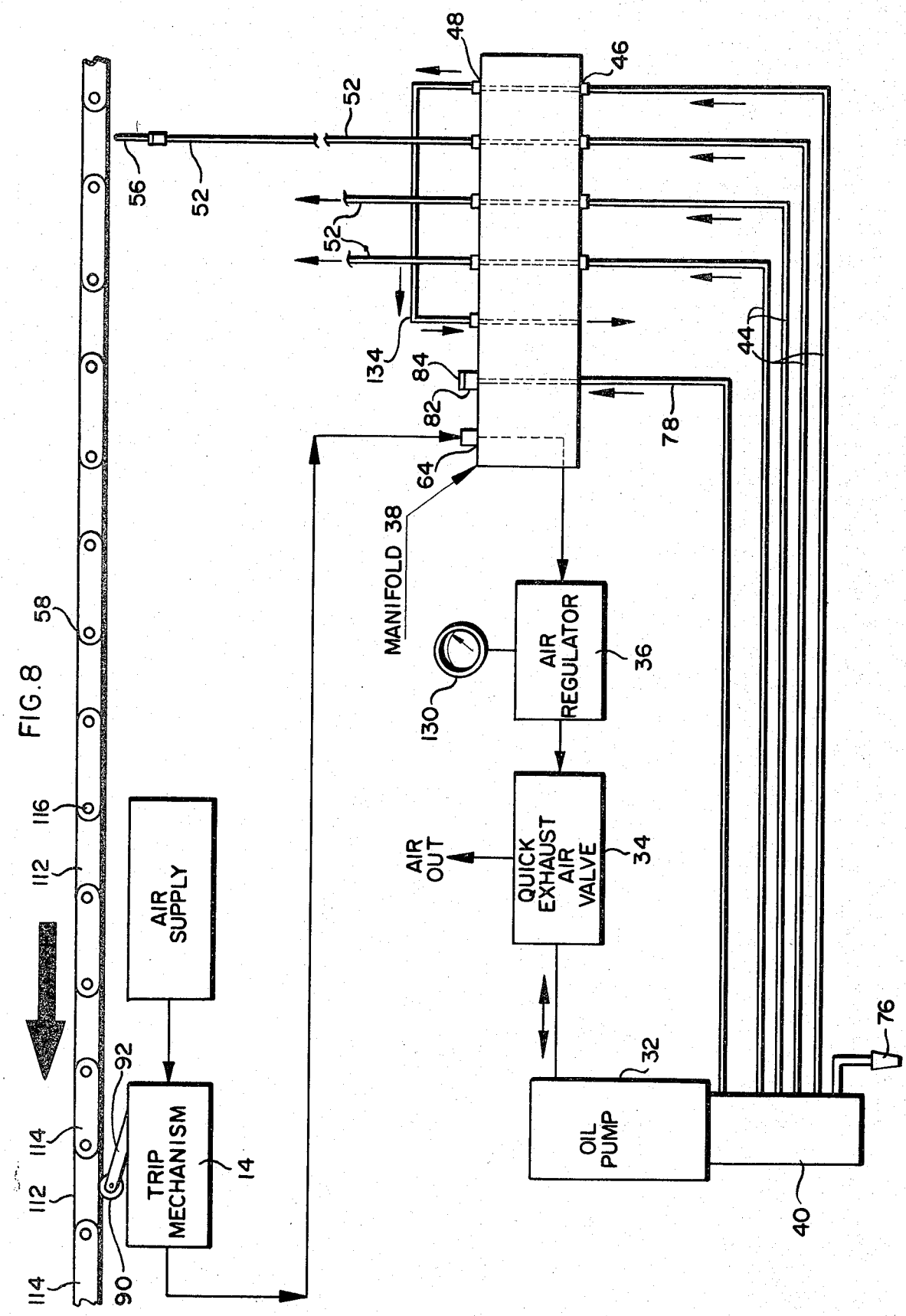
FIG. 8 is a schematic diagram illustrating the lubricating device of the first embodiment of the present invention interconnected and installed for lubricating a chain conveyor.

Pump 32 includes a lower extending body portion 40 having a series of outlet ports 42 coupled to an internal lubricating fluid channel 43. Respective flexible tubing 44 interconnects the pump outlets 42 with a respective one of a plurality of manifold fluid inlets 46 provided on one side of manifold 38. Standard fittings are utilized at each end of tubing 44 for releasibly connecting the ends of tubing 44 to the outlet ports 42 and inlet ports 46. On the opposite side of the manifold 38 there is provided a plurality of fluid outlets 48 which are interconnected to the manifold fluid inlets 46 by respective passageways 50 drilled or otherwise provided in the manifold. Flexible tubing 52 has one end connected by well-known threaded fasteners 54 to the manifold outlet ports 48 and another end connected to a nozzle 56 for delivering clean shots of lubricating fluid to the desired components of a conveyor chain 58 (See FIG. 8). As can be seen from FIG. 3, any of the manifold fluid outlets 48 which are not utilized for lubrication are sealed with a threadable plug cap 60. The metal block forming manifold 38 may be mounted to coverplate 26 by means of four threaded screws 62.

Manifold 38 also includes an air inlet 64, air outlet 66 and a right angled passageway 68 through the manifold interconnecting the air inlet and outlet. As can be seen in FIG. 2, the manifold air outlet 66 is coupled through air regulator 36 and quick air exhaust valve 34 to the pump air inlet 70 by means of standard fittings such as nipples and elbows as required. Piston head 72 includes plunger 73 extending within channel 43. Spring 74 urges the piston head to its top position shown in FIG. 2. Thus, the pressurized air inlet from tubing 16 controlled by air valve trip mechanism 14 is communicated to the pump 32 to urge piston head 72 to compress spring 74 simultaneously forcing lubricating fluid from within the lower pump body portion 40 into tubing 44 and eventually out nozzle or nozzles 56. The pump 32 is a conventional, well-known item available from a number of manufacturers such as Lincoln St. Louis of Missouri. Outlets 42 are spirally arranged around pump body portion 40, enabling dispensing of lubricating fluid from consecutive outlets as plunger 73 moves down channel 43 until it abuts a conventional stop plug 75. The pump 32 is self-priming so that as spring 74 forces piston head 72 back into the upper position, lubricating fluid is drawn into the pump lower body portion 40 via secreen inlet 76. A breather line 78 connects the interior of lower pump body portion 40 to the atmosphere by means of a passageway 80 and an air permeable collar 82 on manifold 38. A vent cap 84 includes a threadable portion having vent holes interconnecting the passageway 80 to the air permeable collar 82. Rubber washer 86 is placed intermediate the end cap 84 and the air permeable collar 82 so that the collar may be firmly maintained in position.

A significant advantage over the prior art is obtained by mounting pump 32 as shown in FIG. 2. In the prior art, it is required to use different sized stop plugs 75 correlated to the number of outlets 42 used in order to obtain reliable pump self-priming. The unused pump outlets are capped. Therefore, if another lubricating line was desired, one must accurately connect it to the next consecutive outlet and also change the stop plug. This time consuming task is eliminated by the present invention. Note in FIG. 2 that all outlets 42 are connected to the manifold inlets 46. A new lubricating line can be provided simply by removing cap 60 from the next consecutive outlet on the manifold exterior and connecting an external line 52 without changing the stop plug 75. Since pump 32 is vertically mounted, any air in chamber between pump plug 75 and plunger 73 will be pumped through the lines thus bleeding air through the lines.

Figure 6:
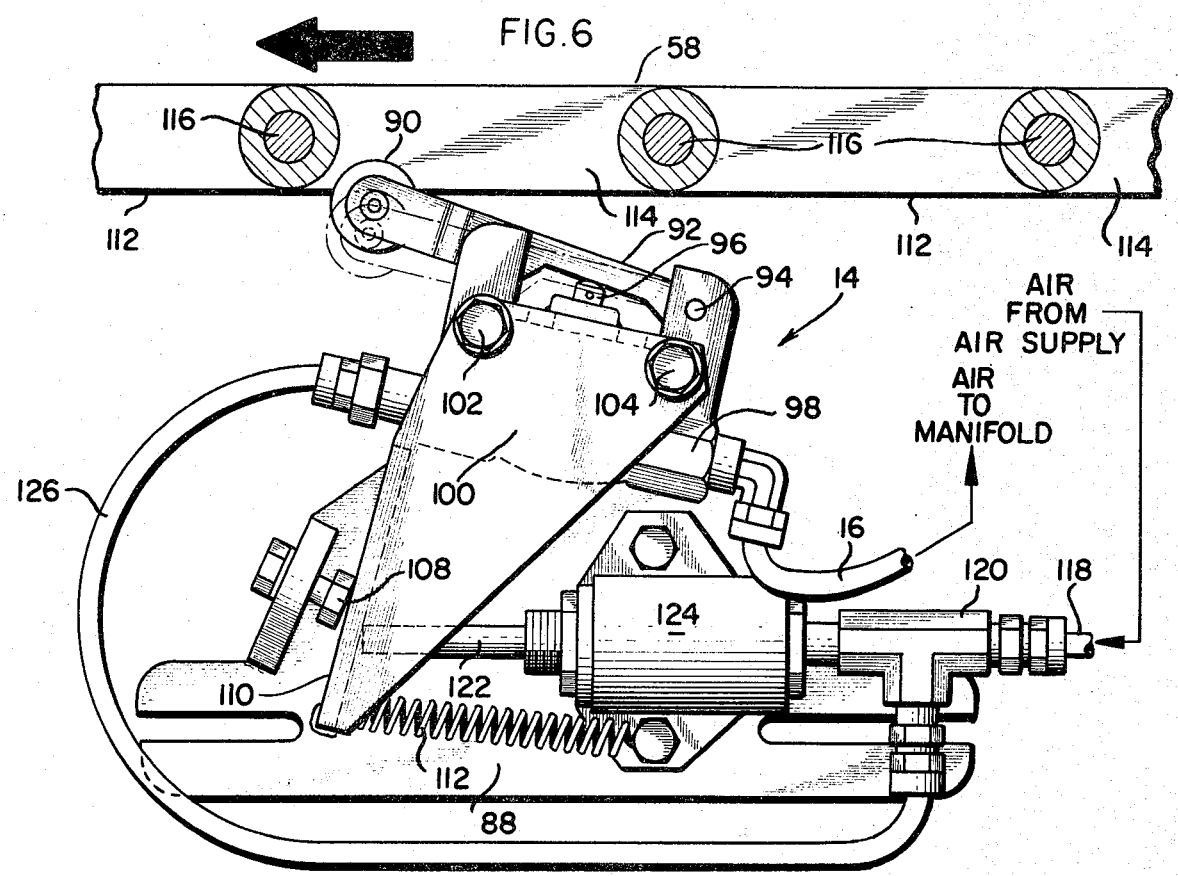
FIG. 6 is a elevational view illustrating the air valve trip mechanism with its pivoting arm in the actuated and non-actuated position.
Figure 7:
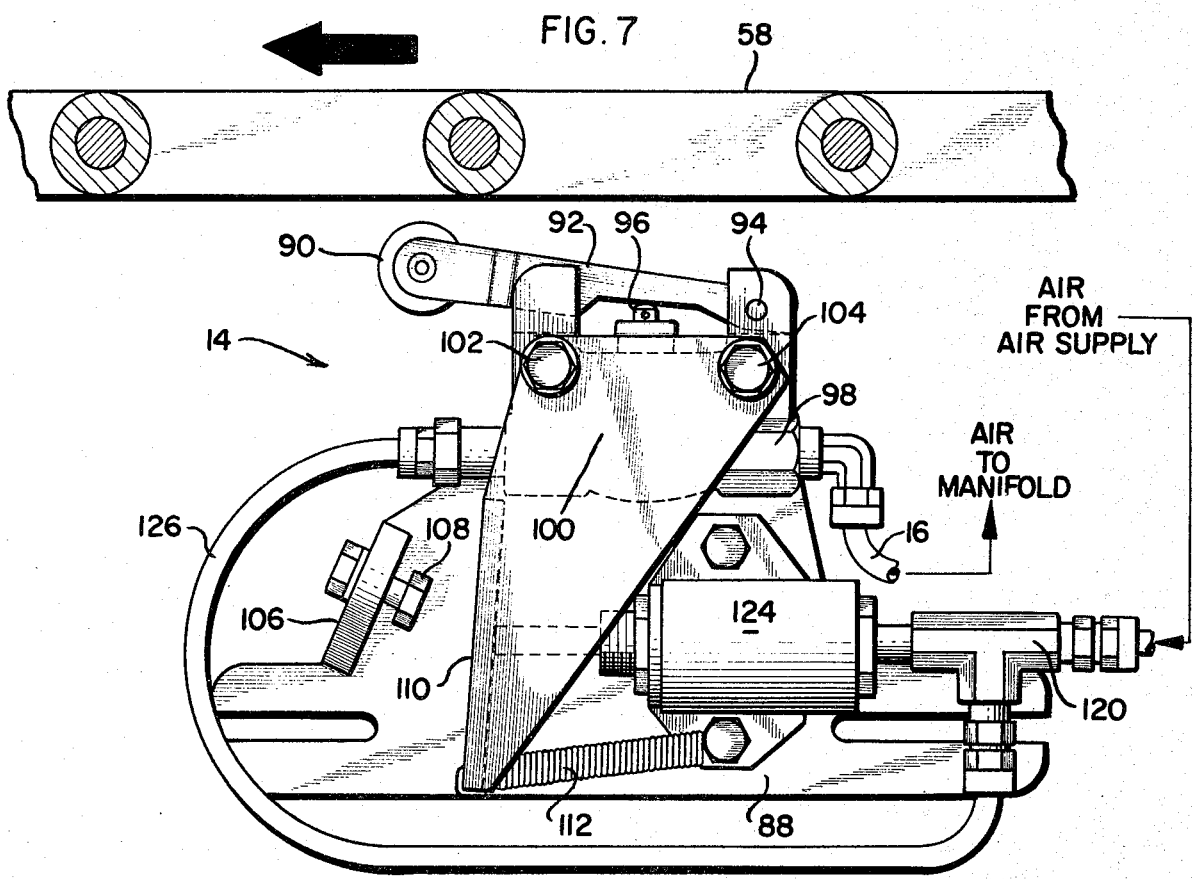
FIG. 7 is a elevational view of the trip mechanism prior to connection to the air supply.

With reference to FIGS. 6 and 7, air valve trip mechanism 14 includes a frame 88 having mounting flanges for installing the unit so that a roller 90 is adjacent a chain conveyor 58. Roller 90 is captured in one end of arm 92, the opposite end of arm 92 being mounted by means such as pivot pin 94 so that the underside of arm 92 can actuatingly engage a plunger 96 of air valve 98. Air valve 98 is mounted to a bracket 100 by means of threaded fasteners 102 and 104. Fastener 102 rigidly mounts the body valve 98 to bracket 100. Fastener 104 on the other hand interconnects the bracket 100, the other end of the body of valve 98, and frame 88 so that the valve 98 and bracket 100 can pivotally position about fastener 104 with respect to the frame 88. An upstanding leg 106 with an adjustable stop 108 is provided for engaging end 110 of the bracket and to adjust the limit of the bracket's pivotable movement with respect to the frame 88.

In the non-operating position of FIG. 7, spring 112 pulls back bracket end 110 so as to lower and thereby disengage roller 90 from contact with the conveyor chain 58.

FIG. 6 illustrates the trip mechanism 14 during operation. It is to be understood that the conveyor chain 58 includes links 112 and 114 interconnected by pivot pins 116, with only the links 112 having a flat bottom portion engageable with roller 90. While the lubricating device of the present invention has been described herein in connection with a movable conveyor chain, this is for purposes of illustration only, since the invention can be utilized in other operating systems, such as rotating machinery, etc., wherein a repetitive relationship exists between a system position sensing item and system points to be lubricated. In operation, standard pressurized air from an available air supply is coupled from tubing 118 through a T-connector 120 to force slidable plunger 122 to project from air valve 124. Plunger 122 counteracts spring 112 to pivot bracket end 110 against the stop 108. This action pivots bracket 100 and valve 98 so as to move roller 90 into the solid line position shown in FIG. 6. In this position air valve 98 blocks the air supply pressure in line 126 from entering line 16.

Movement of the chain conveyor enables the bottom of link 112 to engage roller 90 so as to pivot arm 92 to the illustrated dashed line position thereby depressing valve plunger 96. Pressurized air supplied from tubing line 126 to the input of valve 98 is thus now communicated to manifold air inlet 64 via tubing line 16. Pump 32 is thereby actuated and a clean shot of lubricating fluid is provided through each of the nozzles 56. When the pivot arm 92 goes back into the solid line position of FIG. 6 to release valve 98, spring 74 forces piston 72 to its top position so as to again prime the pump 32 with lubricating fluid. Quick air exhaust valve 34 includes a screened outlet 126 to enable the unit to purge itself of air very rapidly at the end of every cycle. Thus, the air within pump 32 is exhausted to the atmosphere through quick exhaust outlet 126 in valve 34 without passing back through the regulator 36.

Regulator 36 includes adjusting means coupled to knob 128 and an air passage gauge 130 to adjustably supply air pressure to the pump 32. The correct air pressure required by pump 32 is dependent on the number and the length of external tubing lines 52 as well as on the viscosity of the lubricating fluid.

The lubricating device illustrated and as described herein is extremely compact and can be readily installed. As can be seen from FIG. 1, the major components are contained within the tank enclosure 12 with the only major external component being the air valve trip mechanism 14. Thus, installation is readily provided by mounting the trip mechanism in position adjacent the chain conveyor to be lubricated; mounting the nozzles at the desired lubricating points; connecting lubricating fluid tubing 52 to the manifold 38; connecting air line 16 between the trip mechanism 14 and manifold 38; and filling the reservoir in tank enclosure 12 with lubricating fluid through the removable filler cap 132. A recirculating fluid line 134 may be used to return lubricating fluid 18 back to the reservoir via passageway 136 and manifold outlet 138 within tank enclosure 12 to aid in preventing any possible problem in dripping of lubricating fluid from the nozzles 56. As shown in FIG. 3, two lubricating tubing lines are connected to the two upper right hand manifold outlets 48 and the recirculating line is connected to the next outlet.

It is important to note that since the major components are mounted within the tank enclosure 12, they are protected from any corrosive and possibly destructive environment in which such lubricating devices may operate and yet they are readily accessible for any desired maintenance. Also, the location of air pressure regulator 36 and the use of quick exhaust air valve 34 was found to significantly increase the speed of the lubricating operation and to produce a cleaner shot of lubricating fluid from nozzles 56 when compared to prior art devices. Air pressure regulator 36 is mounted on the coverplate closely adjacent and thus closely air coupled to the pump 32 so that the pump can be actuated with the highest desired air pressure, thereby aiding in the dispensing of clean shots of lubricating fluid. Quick air exhaust valve 34 is similarly mounted on the coverplate immediately adjacent the pump for rapidly exhausting air from the pump to permit faster cycling. Quick exhaust air valve 34 is a commercially available item from Scovill Fluid Power Division, Wake Forest, North Carolina. Similarly, air pressure regulator 36 is commercially available from Wilkerson Corporation, Englewood, Colo. In a constructed embodiment of the present invention, the lubricating apparatus 10 provided a reliable repetition of up to 230 lubricating cycles per minute with seven external fluid delivery lines using SAE 20 weight oil.

In the event the presence of lubricating fluid, such as oil, in the air lines causes the accumulation of oil debris in the vicinity of air vent outlet 126 and collar 82, a modified coverplate may be used having a cast bubble or dome around stack type air vents at the vent locations so that the oil could be returned to the reservoir. The bubbles or domes could then be vented to the atmosphere. In addition, if desired, manifold 38 may be cast as an integral part of the coverplate. Also, it is to be understood that electronic or other types of sensing devices, such as photocells, microswitches, etc., actuable by a portion of the moving conveyor or other system to provide air control for suitably operating a pump dispensing shots of lubricating fluid could be utilized.

Figure 9:
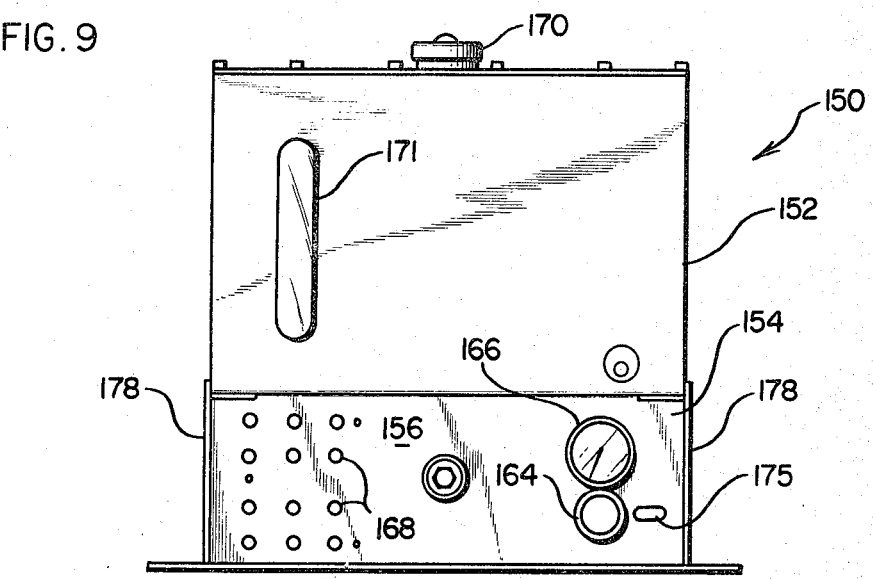
FIG. 9 is a front elevational view of an alternative embodiment of the invention illustrating a top lubricating fluid reservoir mounted on a lower control module sealably enclosing components of the lubricating device.
Figure 10:
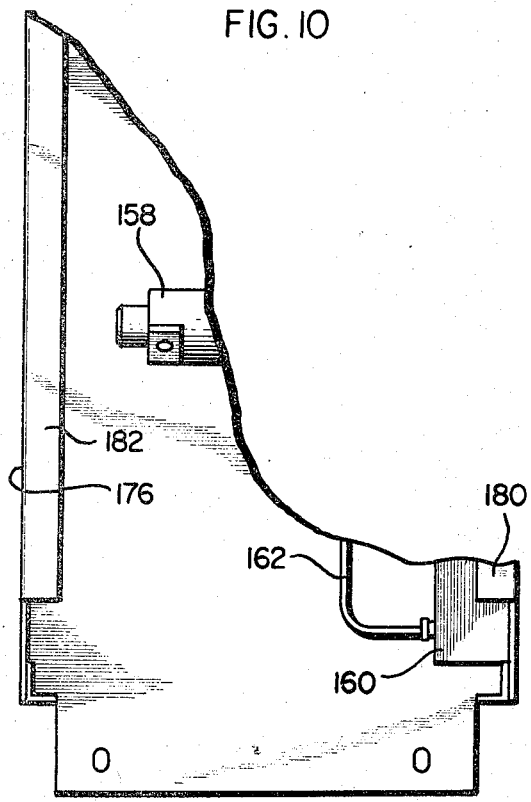
FIG. 10 is a fragmented, top plan view of the lower control module, without the fluid reservoir.
Figure 11:
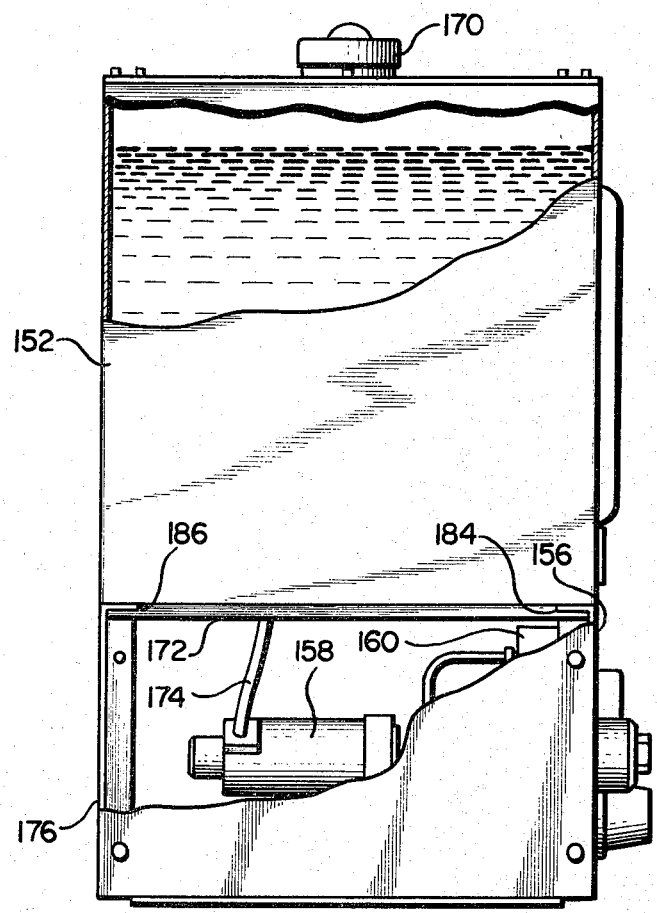
FIG. 11 is a fragmented, side elevational view of the fluid reservoir mounted on the lower control module with the side inspection plate partly cut away.

Referring now to FIGS. 9-11 there is illustrated an alternative embodiment of the invention having several features and which may be preferred over the embodiment illustrated in FIGS. 1-8. Lubricating device 150 includes a lubricating fluid reservoir 152, for containing a lubricating fluid such as oil, mounted above a lower control module enclosure 154. Lubricating components similar to those described in connection with FIGS. 1-8 are mounted to a front panel 156 so as to extend within module 154 and are thus sealed from the environment. The lubricating components, as in the first embodiment, include a fluid pump 158, manifold 160, tubing 162 interconnecting the manifold and pump, an air pressure regulator 164, and an air pressure gauge 166. A plurality of fluid outlets 168 are provided on front panel 156. Tubing (not shown) such as tubing 52 (see FIG. 1), can be connected to the outlets 168 for delivering the clean shots of lubricating fluid as previously described through a nozzle to the desired components of a conveyor chain.

Reservoir 152 includes a removable filler cap 170 for filling the reservoir with lubricating fluid and a sight glass 171 for determining the fluid level within the reservoir. An outlet in the bottom 172 of the reservoir enables the lubricating fluid to be coupled through tubing 174 to the pump inlet. Thus, in this embodiment the lubricating pump is not immersed in fluid, but the components within the control module are still effectively sealed from the environment in a manner similar to the first embodiment.

Inlet 175 is provided to couple an air line from an air valve trip mechanism, such as mechanism 14 illustrated in FIG. 1, to the air regulator and pump in a manner similar to that previously described. It is to be understood that a quick exhaust air valve, similar to valve 34, is mounted within the control module 154 and may be vented through a screened outlet to the interior of the module.

As can be seen from FIGS. 10 and 11, the lower control module 154 is formed with front panel 156, a parallel rear panel 176, and the sides therebetween being open. During installation of the lubricating device, the reservoir 152 initially may not be mounted on the lower control module. This readily enables the lubricating components to be inspected while operating and any possible defective component to be replaced. The reservoir is then mounted in position and the side inspection plates 178 are mounted by suitable means to seal the control module. The readily removable side plates 178 also permit quick inspection of the lubricating components within the control module.

Mounting of reservoir 152 to the control module is provided by means of respective flanges 180, 182 on front panel 156 and back panel 176. The flanges slidably engage respective tracks 184, 186 on the bottom 174 of reservoir 152 as the reservoir is placed at one open side of the control module and slidably moved towards the other open side. Instead of the illustrated flange and track mounting, other means may be used. As an example, an interlocking configuration can be provided wherein a formed lip on the reservoir bottom at the open control module sides matingly locks with a lip at the top of each inspection plate to rigidly maintain the reservoir in position.

While particular embodiments of the present invention have been shown and described, it will be obvious to those skilled in the art that various changes and modifications may be made without departing from the invention in its broader aspects. Accordingly, the aim of the appended claims is to cover all such changes and modifications as may fall within the true spirit and scope of the invention.

We claim:

1. Lubricating apparatus for lubricating movable mechanical systems comprising:
    a tank for containing a reservoir of lubricating fluid;
    a cover for sealing said reservoir;
    a pneumatically actuable pump having an inlet for receiving lubricating fluid and at least one outlet for dispensing lubricating fluid;
    means mounting said pump to said tank with said pump inlet immersible within said reservoir of lubricating fluid and including lubricating fluid conduit means coupled intermediate said pump outlet and said movable mechanical system being lubricated; and
    pneumatic valve trip means including an actuator adapted for mounting adjacent said movable mechanical system for actuation by a component of said system, further including an air valve pneumatically coupled intermediate said pump and a source of air pressure for supplying said air pressure to said pump in response to said actuator, thereby delivering clean shots of lubricating fluid each time said pneumatic valve trip means is actuated.

2. Lubricating apparatus according to claim 1, including air breather means connected to said pump for coupling air within said pump to the atmosphere.

3. Lubricating apparatus according to claim 1, including means for recirculating a portion of said lubricating fluid during dispensing of each of said clean shots of lubricating fluid.

4. Lubricating apparatus according to claim 1, including air pressure regulator means mounted to said cover and pneumatically coupled intermediate said pump and said air valve for adjusting the air pressure supplied to said pump to deliver clean shots of lubricating fluid.

5. Lubricating apparatus according to claim 4, including quick air exhaust means mounted to said cover and pneumatically coupled intermediate said pump and said air pressure regulator for rapidly exhausting air from said pump after each of said clean shots of lubricating fluid is dispensed.

6. Lubricating apparatus according to claim 1, including a manifold having a plurality of respective pneumatic and fluid passageways extending between respective sides of said manifold, said passageways respectively, pneumatically or fluidly coupled to said pump, and means mounting said manifold to said cover with one of said respective sides within said tank and the other of said respective sides on the exterior of said tank.

7. Lubricating apparatus according to claim 6, including air conduit means interconnecting one end of one of said respective manifold pneumatic passageways to said pump and the other end of said pneumatic passageway to said air valve for pneumatically actuating said pump.

8. Lubricating apparatus according to claim 6, wherein said lubricating fluid conduit includes means interconnecting one end of one of said respective fluid passageways to said pump outlet, and nozzle means connected to the other end of said fluid passageway for directing said clean shot of lubricating fluid to a selected portion of said mechanical system.

9. Lubricating apparatus according to claim 6, wherein said air pump includes a plurality of outlets for dispensing lubricating fluid, conduits interconnecting each of said outlets with a respective one of said fluid passageways on said manifold side within said tank, and means on said manifold side on the exterior of said tank connectable to said respective fluid passageways for directing said clean shots of lubricating fluid to desired locations.

10. Lubricating apparatus according to claim 9, wherein said air valve includes a plunger, and means including a bracket, mounting said air valve and said actuator so that said actuator actuatingly engages said plunger to operate said air valve.

11. Lubricating apparatus for lubricating movable mechanical systems comprising:
    an enclosure including a reservoir of lubricating fluid;

a pneumatically actuable pump having an inlet for receiving lubricating fluid and at least one outlet for dispensing lubricating fluid;

means mounting said pump within said enclosure including means communicating said pump inlet to said lubricating fluid in said reservoir and including lubricating fluid conduit means coupled intermediate said pump outlet and said movable mechanical system being lubricated; and pneumatic valve trip means including an actuator adapted for mounting adjacent said movable mechanical system for actuation by a component of said system, further including an air valve pneumatically coupled intermediate said pump and a source of air pressure for supplying said air pressure to said pump in response to said actuator, thereby delivering clean shots of lubricating fluid each time said pneumatic valve trip means is actuated.

12. Lubricating apparatus according to claim 11, wherein said enclosure includes a control module enclosure portion adjacent said reservoir, means mounting said pump within said control module enclosure portion, and a fluid conduit interconnecting said reservoir to said pump inlet.

13. Lubricating apparatus according to claim 12, wherein said lubricating fluid conduit means includes a manifold having at least one fluid passageway extending between respective sides of said manifold, said fluid passageway fluidly coupled to said pump outlet, and means mounting said manifold within said control module enclosure portion.

14. Lubricating apparatus according to claim 11, wherein said enclosure comprises said reservoir and a separable control module enclosure portion, including means mounting said pump within said control module enclosure portion, and a fluid conduit interconnecting said reservoir to said pump inlet.

15. Lubricating apparatus according to claims 12 or 14, wherein said control module enclosure portion includes at least one removable side on said enclosure portion for access in inspecting the interior of said enclosure portion.

* * * * *